W. F. VALLIER.
SPEED CONTROLLING DEVICE FOR MOTOR VEHICLES.
APPLICATION FILED FEB. 27, 1915.
1,166,023.
Patented Dec. 28, 1915.
2 SHEETS—SHEET 2.
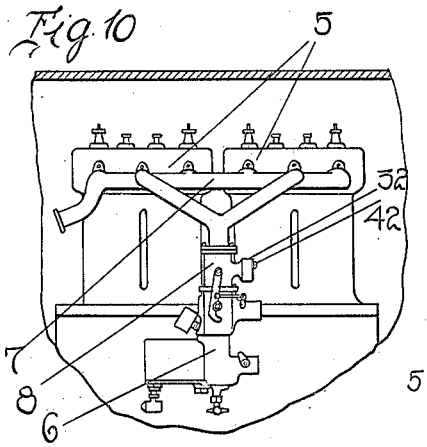
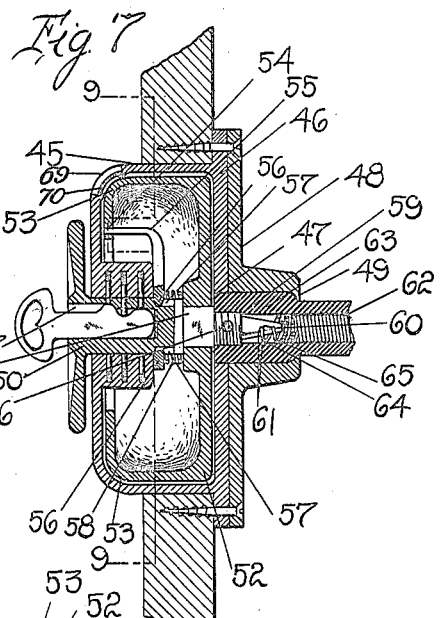
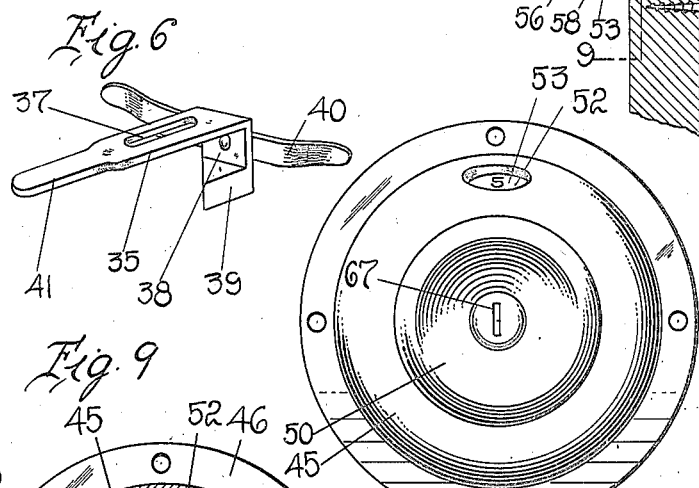
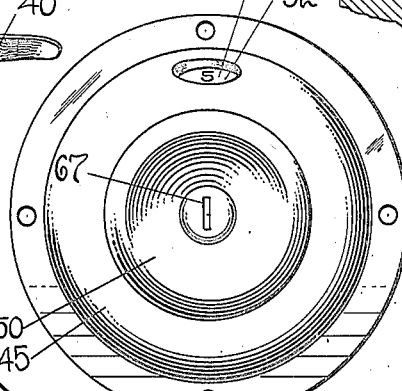
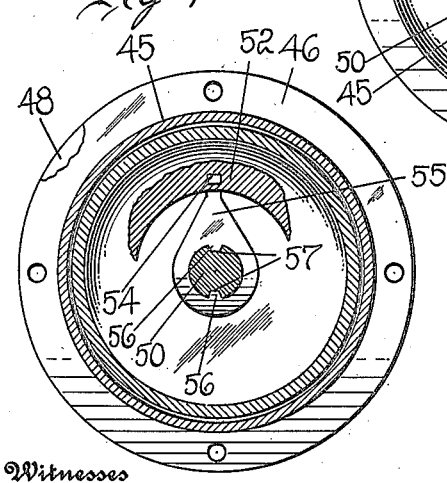
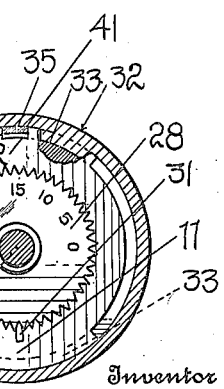
W. F. VALLIER
Inventor
By Watson E. Coleman
Attorney
Witnesses
Robert M. Sutphen
A. L. Hind

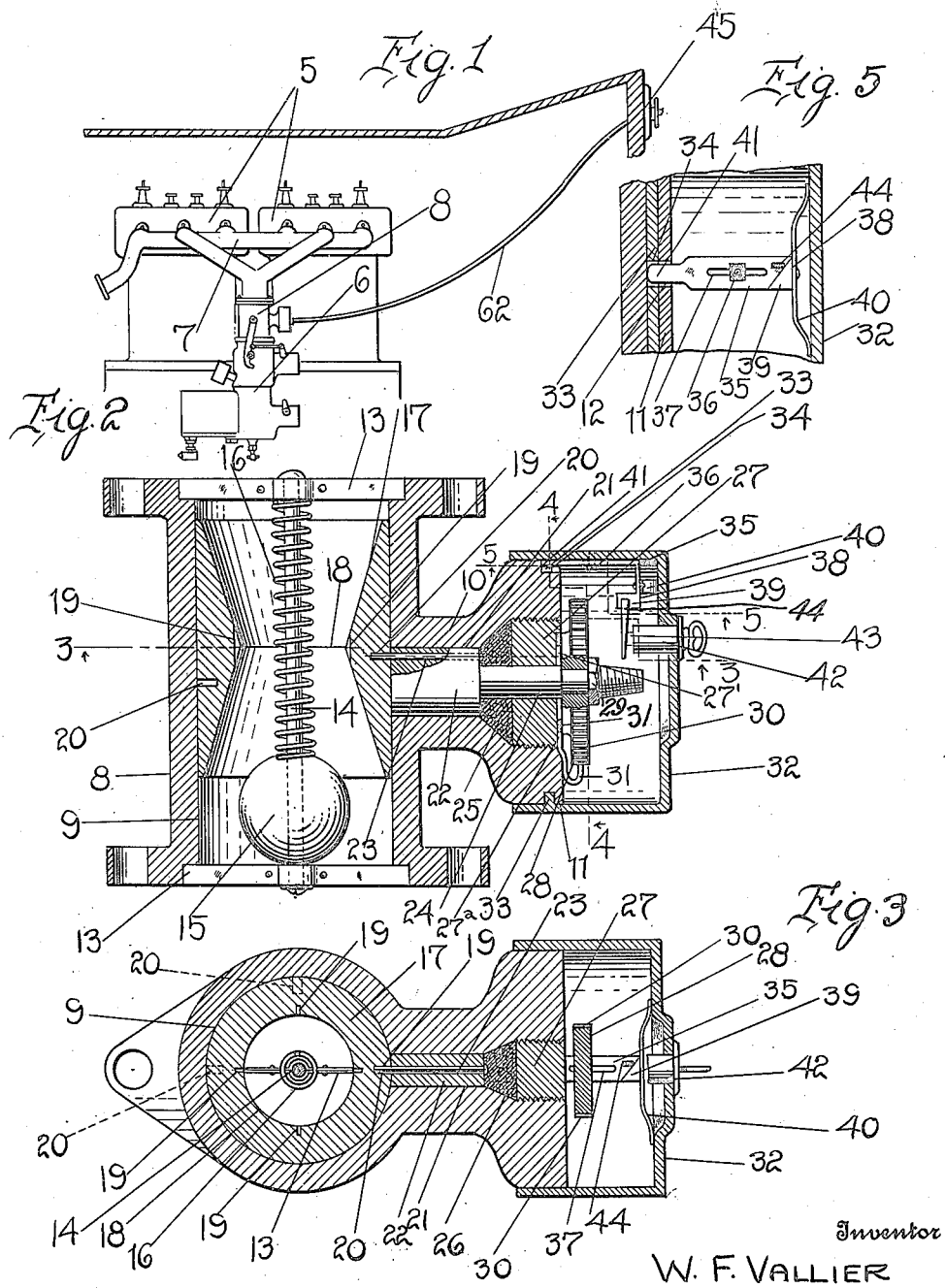

UNITED STATES PATENT OFFICE.

WILFRED F. VALLIER, OF PONTIAC, MICHIGAN.

SPEED-CONTROLLING DEVICE FOR MOTOR-VEHICLES.

1,166,023.  Specification of Letters Patent. Patented Dec. 28, 1915.

Application filed February 27, 1915. Serial No. 11,024.

*To all whom it may concern:*

Be it known that I, WILFRED F. VALLIER, a citizen of the United States, residing at Pontiac, in the county of Oakland and State of Michigan, have invented certain new and useful Improvements in Speed-Controlling Devices for Motor-Vehicles, of which the following is a specification, reference being had to the accompanying drawings.

This invention relates to an improved speed controlling device for motor vehicles, and has for its primary object to provide means for regulating and controlling the supply of air and gas to the engine cylinders whereby the engine is operated at a predetermined speed.

The invention has for an additional object to provide a speed controlling device for the engine of a motor vehicle, which is operable by the driver of the machine from his position, the controlling mechanism being locked after it is adjusted or set for a predetermined speed so as to preclude either the operation of the machine or a change in the engine speed by unauthorized parties.

The invention has for an additional object to provide a mechanism for the above purpose, which is comparatively simple in its construction, is not liable to easily get out of order, and does not necessitate any material alterations in the construction of motor vehicles now in common use.

With the above and other objects in view, my invention consists in the novel features of construction, combination, and arrangement of parts to be hereinafter more fully described, claimed, and illustrated in the accompanying drawings, in which, Figure 1 is a longitudinal section through the forward end of a motor vehicle the motor being shown in elevation, illustrating the application of my invention thereto; Fig. 2 is an enlarged vertical section through the speed controlling device; Fig. 3 is a section taken on the line 3—3 of Fig. 2; Fig. 4 is a section taken on the line 4—4 of Fig. 2; Fig. 5 is a section taken on the line 5—5 of Fig. 2; Fig. 6 is a detail perspective view of the locking bar for the cap or housing; Fig. 7 is an enlarged vertical section through the speed indicator and lock mounted upon the cowl or body of the machine; Fig. 8 is a front elevation thereof; Fig. 9 is a section taken on the line 9—9 of Fig. 7; and Fig. 10 is a view similar to Fig. 1, showing the application of the invention to the engine of a motor truck.

Referring in detail to the drawings, 5 designates the cylinders of an internal combustion engine, which are supplied with air and gas from the usual carbureter 6. Between the manifold 7 which is connected to the engine cylinders and the carbureter 6, a coupling or connection 8 is interposed and suitably secured thereto. This coupling member is formed with a longitudinal passage or conduit 9 which constitutes a continuation of the manifold 7. The coupling 8 is formed with a lateral extension 10, the outer end of which is enlarged and provided at diametrically opposite points upon its periphery with the arcuate lips or flanges 11, one of said flanges being centrally recessed or notched, as at 12 (to be later explained).

In the opposite ends of the passage or conduit 9, a cross bar 13 is suitably secured at its extremities to the wall of the coupling member. The ends of a vertically disposed rod 14 are centrally secured in the respective cross bars 13, and upon this rod, the metal ball 15 is loosely engaged and normally rests upon the lower cross bar 13. This ball is yieldingly held against upward movement upon the rod by means of a coil spring 16 which is arranged upon the rod between said ball and the upper cross bar. A longitudinally movable sleeve 17 fits snugly in the conduit or passage 9 and the bore of this sleeve gradually decreases from its opposite ends to its longitudinal center, thereby producing a central annular ridge 18. This ridge has short longitudinal grooves 19 cut therein at spaced points. These grooves constitute by-passes for the gaseous mixture around the valve ball and result in an even flow thereof so that the motor will run smoothly, and throbbing of the same will be avoided. The sleeve 17 is also provided in its outer peripheral face with a number of sockets 20 which are disposed at relatively different distances from the ends of the sleeve.

The extension 10 of the coupling 8 is provided with a smooth bore section 21 to receive a cylinder 22. An eccentrically located pin 23 is fixed in said cylinder and projects beyond the inner end thereof, said projecting end of the pin being adapted for engagement in any one of the sockets 20 of the sleeve 17. The cylinder 22 has a reduced concentric extension 24 formed upon its other end and axially disposed through a packing chamber 25 formed in the outer end of the extension 10. Suitable packing material, indicated at 26, is disposed in this chamber and a nut 27 is adapted to be threaded into the outer end of the chamber to compress said packing against the outer end of the cylinder 22. Thus a fluid tight mounting of the cylinder is obtained, and escape of the air and gas around the valve 17 and through the bore 21, is obviated.

The outer end of the reduced extension 24 upon the cylinder 22, is threaded to receive a disk 28 which is retained thereon by a nut 29. The periphery of this disk is toothed or serrated as at 30, and is adapted to be engaged by a spring pawl 31. This pawl constitutes an arm or extension on a ring or annulus 31' which is seated in an annular groove or recess 27' provided in the end face of the nut 27, said nut being also provided with a diametrically extending groove 27$^a$ which communicates with the annular groove and opens at one of its ends upon the periphery of said nut. Through this latter end of the groove 27$^a$, the arm or spring pawl 31 extends. The extremity of the extension 24 on the cylinder 22, projects beyond the face of the disk 30 and is suitably threaded to constitute a coupling nipple for the connection of one end of a flexible shaft thereto.

A cap or housing 32 is adapted to be arranged over the disk 30 and securely locked upon the extension 10 of the coupling. To this end, the annular wall of said cap or housing is provided upon its inner face and adjacent to its outer end, with diametrically opposed flanges 33, one of which is centrally recessed as at 34. A longitudinally shiftable locking bar 35 is carried by this cap, the longitudinal movement thereof being limited by a pin or stud 36 fixed in the wall of the cap and projecting through a longitudinal slot 37 in the locking bar. The inner end of the locking bar is angularly bent, as shown at 38, to extend radially of the cap, and upon the extremity thereof a beveled lip or shoulder 39 is formed. A leaf spring 40 is also fixed, intermediate of its ends, upon the end of the locking bar, and bears at its extremities against the end wall of the cap 32. The opposite end of the locking bar 35 is reduced in width to provide a locking tongue 41 which is adapted to be engaged through the recess or notch 12 in the flange 11 of the coupling extension 10 and the notch or recess 34 in the flange 33 on the cap or housing, when said cap has been turned to dispose the flanges thereon behind the flanges 11 and bring the recess 34 into registering relation with the notch or recess 12. In the end wall of the cap 32, a suitable lock 42, preferably of the Yale type, is mounted, said lock including a rotatable part 43 upon the inner end of which an arm 44 is fixed. When the proper key is inserted into the lock and the rotatable member 43 turned in one direction, the end of the arm 44 is adapted to ride upon the beveled or inclined shoulder on the end of the locking bar 35, and retract the tongue 41 of said bar from the notch or recess 34, against the action of the spring 40, thus releasing the cap 32 so that the same may be turned and removed from the coupling extension 10.

Upon the dashboard or cowl of the vehicle body, the steering post or other place within convenient reach of the operator, an indicator and lock for the mechanism is secured. This indicator includes a suitable casing 45 having a base plate 46 which is adapted to be secured to the fixed part of the machine. This base plate is provided with a central opening 47 and upon said base plate, a second plate 48, having a central opening surrounded by a tapering boss 49, is adapted to be engaged and secured by the fastening screws for the indicator casing. In the front wall of the casing 45, a rotatable member 50 is mounted, said member having a reduced rectangular inner end portion 51 upon which the indicator 52 is engaged. This indicator is in the form of a ring or annulus having an inwardly projecting rim portion provided with an obliquely inclined outer face 53 upon which the numerals indicating various speeds of travel, are embossed or otherwise delineated. The inwardly projecting rim of the indicator 52 is provided with an opening 54 to receive the forwardly projecting extremity of a locking member 55. The opposite end of this member is enlarged and provided with an opening to receive the rotatable member 50. Said locking member is provided with key lugs 56 at diametrically opposite sides of said opening for engagement in the longitudinal keyways 57 in the periphery of said rotatable member. A coil spring 58 is disposed upon the member 50 between the indicator 52 and the locking member 55, and normally urges said locking member in one direction to retain the outer end thereof within the opening 54 of the indicator, and in frictional engagement with the wall of the casing 45. Thus the indicator 53 will be held against casual shifting movement from its set position, which would occur when the parts become worn after a short period of use. The member 50 is also provided with a reduced threaded extension 59 projecting from the squared portion 51 and terminating in the tapering extremity 60. This tapering extremity of the member 50 is provided with spaced orifices 61.

62 indicates a flexible shaft of any conventional construction, which connects the member 50 to the rotatable cylinder 22. As shown, this flexible shaft includes an outer fabric or rubber casing 63 and the reversely coiled inner and outer springs 64 and 65, respectively. The tubular shell or casing 63 is adapted to be engaged upon the threaded nipple or extension 59 of the member 50, and the extremities of the respective springs 64 and 65 are inserted through the orifices 61 in the tapering extremity of said member. The boss or extension 49 on the plate 48 provides a guide and support for the end of the flexible shaft. As an additional means of security, a cotter pin indicated at 66, is disposed through an opening in the tapering extremity of the member 50 and through the outer casing of the flexible shaft. While I have referred to this specific manner of attaching the shaft to the member 50, it is to be borne in mind that the present invention is not limited thereto, as various other modes of establishing this connection may be adopted.

The member 50 is provided with a longitudinal key slot indicated at 67 which is adapted to receive a suitable key for actuating a plurality of locking tumblers, whereby the member 50 may be held against further rotation after the indicator 52 has been turned and the controlling mechanism is set for the operation of the engine at a predetermined speed. It will be understood that when the key is withdrawn the locking tumblers mounted in the member 50 and in the wall of the case 45 are projected to their normal positions, whereby said member is securely locked against further rotation and the flexible shaft connected to the spindle 24 is held against turning movement. It is, of course, understood that there are a number of series of the locking tumbler pins arranged in the stationary part so as to lock the member 50 in various positions. This locking device may also be of any conventional form, the Yale type of lock preferably being provided.

In the use of my invention upon motor trucks and like commercial vehicles, as shown in Fig. 10, the indicator last described may be dispensed with and only the controlling mechanism for regulating the passage of air and gas from the carbureter to the engine employed. In order that the operator may ascertain when the parts have been adjusted to the predetermined speed, the face of the disk 30 is also preferably provided with the indicating characters in a similar manner to the indicator 52.

In the operation of the controlling valve, the operator turns the disk 30 so as to rotate the cylinder 22. The pin 23 which fits loosely in the socket 20 of the sleeve 17, being eccentric to the axis of said cylinder, moves said sleeve downwardly in the passage or conduit 7 and decreases the area of the unobstructed passage between the ball 15 and the tapering wall of said sleeve through which the air and gas may freely travel. The air and gas entering the lower end of the sleeve 17 are compressed as they approach the narrower central portion of the sleeve, so that they become intermingled. The sudden expansion of the air and gas, after passing this restricted portion of the passage or conduit into the upper end of the sleeve, causes a further intermingling and thorough unification of the air and gas. By thus obtaining a proper mixture of the air and gas, combustion is greatly facilitated and a greater explosive force obtained, thereby conducing to material economy in the consumption of the motive fluid. As the air is drawn into the engine cylinders through this space, the increased pressure of the air and gas upon the ball 15 raises said ball against the tension of the spring 16 until the ball engages against the wall of the sleeve bore at its central portion and completely cuts off further flow of the air and gas to the engine cylinders. When the engine has attained the predetermined speed desired, the decrease of vacuum pressure against the ball 15 permits said ball to drop to a slight extent and thus again admit the air and gas through the pipe 9 to the engine cylinders. This action is repeated until the flow of gas and air becomes uniform and the ball 15 remains practically stationary and the engine continues to run at the set and predetermined speed. In different makes of motor vehicles, the extent of adjustment of the sleeve 17, necessary in order to attain various operating speeds, will differ, and for this reason, the series of sockets 20 are provided in the sleeve so that the pin 23, carried by the cylinder 22, may be disposed in the proper one of said sockets, in accordance with the circumstances of each particular case. After the sleeve has been properly adjusted, the cap 32 is engaged upon the extension of the coupling 8 over the disk 30 and locked thereon in the manner above explained, so that said disk cannot be manipulated by unauthorized parties to change the speed of the engine. When the zero mark upon the face of the disk 30 is disposed in vertical alinement above the axial center of the cylinder 22, the sleeve 17 will be rotated in the passage or conduit 9 to its limit and engaged with the ball 15 so that the flow of gas and air to the cylinders of the engine is cut off and the engine cannot be operated. This complete closing or cutting off of the supply of gas and air to the cylinders of the engine is applicable only to the use of the device upon pleasure vehicles. By the provision of the adjustable connection between the operating cylinder 22 and the longitudinally shiftable sleeve 17, I am enabled to obtain a very fine variation of the volume of air and gas entering the engine cylinders. In this adjustment of the extent of movement of the sleeve, the extent of movement or lift of the valve ball will, of course, also vary correspondingly. The device may, therefore, be readily adjusted to any size of the engine cylinders or particular type of engine which may be employed.

In the use of the invention upon pleasure vehicles, the dashboard indicator and locking device is employed, the member 50 being connected to the threaded extension or nipple 28 by means of the flexible shaft 62. In order to now adjust the sleeve 17, the operator inserts his key into the key slot 67 in the member 50 and thereby releases said member for rotation. Upon rotation of this member, the flexible shaft is, of course, turned, and rotation imparted to the cylinder 22, whereby said cylinder 17 is raised or lowered to the desired point. The indicator member 52 is also turned until the numeral upon the face 53 thereof, indicating the desired speed of travel, appears through a sight opening 69 provided in the casing 45, said sight opening being permanently closed by means of a plate of celluloid, glass or other transparent material, as shown at 70. Upon withdrawing the key from the member 50, the mechanism becomes automatically locked and cannot be further manipulated or adjusted.

From the foregoing description, taken in connection with the accompanying drawings, the construction, manner of operation, and several advantages of my improved speed controlling mechanism, will be clearly and fully understood. The device may be very easily and quickly operated from the driver's seat to regulate the supply of air and gas to the cylinders of the engine, and when adjusted, securely locked against further operation so that the machine cannot be operated beyond a desired speed. The owner of the machine may also cut off the supply of gas to the engine cylinders, and thereby obviate theft of the machine, owing to the impossibility of operating the same.

The several parts of the mechanism above described are exceedingly simple in their construction and may be produced at comparatively small manufacturing cost. The device is adaptable to various makes of motor vehicles now in common use, and in the installation thereof, no material alterations in the vehicle construction are required. It will, however, be understood that such changes or alterations in the form or proportion of the several parts, as may be necessary to render the invention applicable to particular types of motor vehicles, may be resorted to without departing from the essential features or sacrificing any of the advantages thereof.

Having thus fully described my invention, what I desire to claim and secure by Letters Patent is:—

1. The combination with a motor vehicle engine, of a controlling valve arranged in the supply conduit to control the supply of motive fluid to the engine cylinders, said valve including a valve member operated by suction through the conduit, a relatively movable element arranged in said conduit, and manually operable means adjustably connected to said movable element, to position the same with respect to the valve member, whereby the maximum extent of movement of the latter may be varied.

2. The combination with a motor vehicle engine, of a suction operated valve member mounted in the supply conduit to the engine cylinders, an element longitudinally shiftable in the conduit with respect to said valve member to vary the volume of the fluid passing through the conduit to the engine cylinders, a rotatable part and an adjustable eccentric connection between the rotatable part and said element, whereby the maximum extent of movement of said element with respect to the valve member may be varied.

3. The combination with a motor vehicle engine, of an adjustable valve to control the supply of motive fluid to the engine cylinders, said valve including a movable element arranged in the passage between the carbureter and the engine cylinders, a rotatable part directly connected to said movable element to actuate the latter and increase or decrease the volume of fluid flowing through said passage to the engine cylinders, whereby the engine is operated at a predetermined speed, and means for preventing access to said rotatable part and precluding a change of the engine speed after said valve member has been adjusted.

4. The combination with the internal combustion engine of a motor vehicle, of a controlling valve arranged in the conduit connecting the carbureter to the engine cylinders and including a rectilinearly movable element adapted to increase or decrease the volume of the motive fluid flowing through said conduit to the engine cylinders, a rotatable part and means on said part engaged with said element to adjust the same in the conduit whereby the engine may be operated at a predetermined speed, and positively hold said element against movement from its adjusted position.

5. The combination with the internal combustion engine of a motor vehicle, of a controlling valve arranged in the conduit connecting the carbureter to the engine cylinders and including a spring held valve member and an element longitudinally shiftable in the conduit toward or from said valve member to increase or decrease the volume of motive fluid flowing through said conduit, means for actuating said element and positively holding the same in adjusted position against fluid pressure, whereby the speed of operation of the engine may be predetermined, and means for preventing a subsequent operation of said last named means after said element has been adjusted.

6. The combination with the internal combustion engine of a motor vehicle, of a controlling valve arranged in the conduit connecting the carbureter to the engine cylinders and including a spring held valve member, an element longitudinally shiftable in said conduit toward or from the valve member and having a tapering bore, whereby the volume of motive fluid passing through the conduit to the engine cylinders is increased or decreased, and means for actuating said element consisting of a movable part, and an adjustable connection between said movable part and said element whereby the maximum extent of movement of the latter may be varied.

7. The combination with the internal combustion engine of a motor vehicle, of a controlling valve arranged in the conduit between the carbureter and the engine cylinders including a spring held valve member and longitudinally shiftable element having a tapering bore and adapted for movement toward or away from the valve member whereby the volume of motive fluid passing through said conduit to the engine cylinders may be increased or decreased, a rotatable part, and an adjustable coöperative connection between said rotatable part and said element whereby the maximum extent of longitudinal shifting movement of the element in the conduit may be varied.

8. The combination with the internal combustion engine of a motor vehicle, of a controlling valve arranged in the conduit between the carbureter and the engine cylinders including a spring held valve member and longitudinally shiftable element having a tapering bore and adapted for movement toward or away from the valve member whereby the volume of motive fluid passing through said conduit to the engine cylinders may be increased or decreased, a rotatable part having its axis disposed at right angles to the axis of said valve element, and an adjustable coöperative connection between said rotatable part and said element whereby the maximum extent of longitudinal shifting movement of the element in the conduit may be varied.

9. The combination with the internal combustion engine of a motor vehicle, of a controlling valve arranged in the conduit between the carbureter and the engine cylinders including a spring held valve member and longitudinally shiftable element having a tapering bore and adapted for movement toward or from the valve member whereby the volume of motive fluid passing through said conduit to the engine cylinders may be increased or decreased, a rotatable part, and an eccentrically located pin carried by said part and coöperatively engaged with the longitudinally shiftable element to shift the same in the conduit.

10. The combination with the internal combustion engine of a motor vehicle, of a controlling valve arranged in the conduit between the carbureter and the engine cylinders including a spring held valve member and longitudinally shiftable element having a tapering bore and adapted for movement toward or from the valve member whereby the volume of motive fluid passing through said conduit to the engine cylinders may be increased or decreased, a rotatable part having its axis disposed at right angles to the axis of said longitudinally shiftable element, said element being provided in its periphery with a plurality of sockets disposed at relatively different distances from the ends of said element, said pin being adapted for engagement in any one of said sockets, whereby the extent of longitudinal shifting movement of the element in the conduit may be varied.

In testimony whereof I hereunto affix my signature in the presence of two witnesses.

WILFRED F. VALLIER.

Witnesses:
 FLOSSIE B. VALLIER,
 BIRDIE J. WEBSTER.